O. R. Smith,
Burrow Trap,
No. 81,023. Patented Aug. 11, 1868.
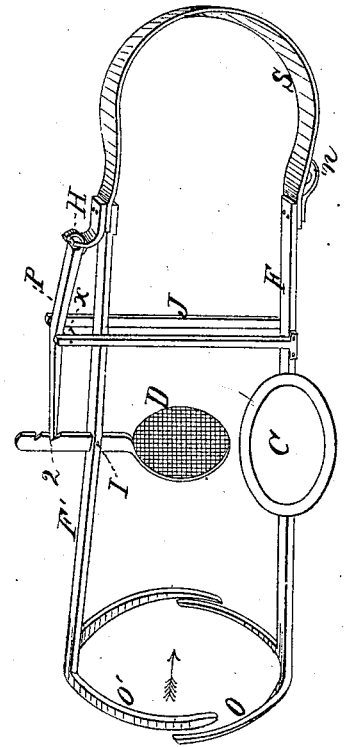
Witnesses
Moses Ross
John M. Townsend
Inventor
Oscar R. Smith

United States Patent Office.

OSCAR R. SMITH, OF ELGIN, MINNESOTA.

*Letters Patent No. 81,023, dated August 11, 1868.*

---

IMPROVED ANIMAL-TRAP.

---

*The Schedule referred to in these Letters Patent and making part of the same.*

---

TO ALL WHOM IT MAY CONCERN:

Be it known that I, OSCAR R. SMITH, of the town of Elgin, in the county of Wabasha, and State of Minnesota, have invented a new and useful Animal-Trap; and I do hereby declare that the following is a full and exact description of the same.

The nature of my invention consists in constructing a trap designed to catch such animals as burrow in the ground, (but may, however, be used for other species,) and is so arranged that it can be inserted in the burrows of the same, and to prevent the exit of said animals without their passing through or between the jaws of the trap, as it is so constructed that, when set, the jaws completely or nearly touch the entire circumference of the burrow, leaving a passage for the animal only between the jaws of the same, and being so arranged that it can be sprung by the animal only after it has passed partly through, or between the jaws of said trap, thus catching the animal around the body instead of by the foot, as generally done by the traps now in use.

To enable others skilled in the art to make and use my invention, I will proceed to describe its construction and operation.

For the bar or lower frame of the trap I use malleable or wrought iron, or other similar material. The upper frame is of the same material.

By reference to the drawing attached, F represents the lower frame; O, a jaw or part of the same; F', the upper frame; O', the corresponding jaw. S is the spring, to the extremities of which are fastened the ends of the frames F F'. D is a pan or trigger. P is a catch, which catches in a notch, 2, in the trigger. J is a standard, having a slot through which passes frame F', and having at its upper end a cross-bar, x, on which rests the catch P. H is a hinge upon which the catch P turns. The frame F has a mortise or slot through which passes loosely the trigger D, as shown in the drawing. I is a pin passing through the frame F', and also loosely through the stem of trigger D upon which it plays. n is a lug or ear to which a chain may be attached. The spring S is made ordinarily of sheet steel, but may be forged, and is bent somewhat in a horse-shoe form, but with the ends closer together, and thus tempered. The ends of the spring have one or more holes for rivets, and one end of each of the frames F F' has corresponding holes, also the hinge H, and ear n, and when riveted together form a strong and durable fastening. The standard J may be made of malleable iron, and is fastened to frame F by rivets or their equivalents. The frame F has an annular opening, C, through which the trigger D passes when the trap is sprung.

The operation of this trap is as follows: The trap is set by opening the jaws O O', then resting the catch P across the support x on standard J, then bringing the trigger D to a position so that the notch 2 catches on the end of the catch P, which fastens the spring and jaws in the position shown in the drawing.

The end of the trap is then put in the burrow, with the jaws towards where the animal is supposed to be, and whenever it endeavors to come out, it has to pass between the jaws O O', and the trigger D being directly in its path, (as it comes in the direction shown by the arrow in the drawing,) its head or foot touches the same, and releases the catch P, when the jaws O O' close up, and catch the animal around the body, which effectually prevents its escape.

Having thus described my invention, and the operation thereof, what I claim, and desire to secure by Letters Patent, is—

1. The combination of the spring S with the frames F F', the catch P, the trigger D, and the jaws O O', all arranged to operate substantially in the manner set forth.

2. The semicircular shape of the jaws O O', whereby they fit the burrow of an animal when the trap is set.

OSCAR R. SMITH.

Witnesses:
  MOSES ROSS,
  JOHN M. TOWNSEND.